US012041332B2

(12) United States Patent
Nishitsuji et al.

(10) Patent No.: US 12,041,332 B2
(45) Date of Patent: Jul. 16, 2024

(54) LIGHT SHIELDING PLATE, CAMERA UNIT, ELECTRONIC DEVICE, AND METHOD OF MANUFACTURING LIGHT SHIELDING PLATE

(71) Applicant: TOPPAN INC., Tokyo (JP)

(72) Inventors: Kiyoaki Nishitsuji, Tokyo (JP);
Shinichi Shimamura, Tokyo (JP);
Hiroyasu Aizawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 59 days.

(21) Appl. No.: 17/866,674

(22) Filed: Jul. 18, 2022

(65) Prior Publication Data

US 2022/0353393 A1    Nov. 3, 2022

Related U.S. Application Data

(63) Continuation of application No. PCT/JP2021/001872, filed on Jan. 20, 2021.

(30) Foreign Application Priority Data

Jan. 20, 2020  (JP) .................................. 2020-006833

(51) Int. Cl.
*H04N 23/55* (2023.01)
*H04N 23/51* (2023.01)

(52) U.S. Cl.
CPC ............. *H04N 23/55* (2023.01); *H04N 23/51* (2023.01)

(58) Field of Classification Search
CPC ........ H04N 23/50; H04N 23/51; H04N 23/55; H04N 23/75; G03B 9/02; G03B 30/00
See application file for complete search history.

(56) References Cited

U.S. PATENT DOCUMENTS

2006/0018041 A1* 1/2006 Hirata ................ G02B 27/0018
359/738
2015/0022896 A1* 1/2015 Cho .......................... G02B 1/04
359/601
(Continued)

FOREIGN PATENT DOCUMENTS

CN       101546132 A      9/2009
CN       109642310 A      4/2019
(Continued)

OTHER PUBLICATIONS

International Searching Authority, "International Search Report," issued in connection with International Patent Application No. PCT/JP2021/001872, dated Apr. 13, 2021, 7 pages.
(Continued)

*Primary Examiner* — Daniel M Pasiewicz
(74) *Attorney, Agent, or Firm* — Foley & Lardner LLP

(57) ABSTRACT

A light shielding plate includes a front surface located on a light incident side, a rear surface opposite to the front surface, and a hole passing through the light shielding plate between the front surface and the rear surface. The hole has a first hole portion and a second hole portion connected to the first hole portion at an intermediate opening thereof. The first hole portion extends from a rear surface opening on the rear surface to the intermediate opening and is shaped so as to taper from the rear surface toward the front surface. The second hole portion extends from a front surface opening on the front surface to the intermediate opening and is shaped so as to taper from the front surface toward the rear surface. The front surface opening is larger than the rear surface opening. The intermediate opening has a circularity of 3 μm or less.

9 Claims, 6 Drawing Sheets

(56) References Cited

U.S. PATENT DOCUMENTS

| | | | | |
|---|---|---|---|---|
| 2015/0253532 A1* | 9/2015 | Lin | ................. | G02B 7/022 |
| | | | | 359/601 |
| 2016/0349504 A1* | 12/2016 | Kim | ................. | G02B 27/0018 |
| 2018/0138351 A1* | 5/2018 | Hsu | ................. | H01L 33/44 |
| 2019/0144989 A1 | 5/2019 | Nishi | | |
| 2020/0132986 A1* | 4/2020 | Lai | ................. | G02B 1/115 |
| 2020/0158981 A1* | 5/2020 | Feng | ................. | G02B 7/026 |
| 2022/0353393 A1 | 11/2022 | Nishitsuji et al. | | |

FOREIGN PATENT DOCUMENTS

| | | |
|---|---|---|
| JP | 2006-072151 A | 3/2006 |
| JP | 2010-008786 A | 1/2010 |
| JP | 2011-107588 A | 6/2011 |
| JP | 2016-109959 A | 6/2016 |
| JP | 2021-113920 A | 8/2021 |
| WO | WO-2016/060198 A1 | 4/2016 |

OTHER PUBLICATIONS

International Searching Authority, "Written Opinion," issued in connection with International Patent Application No. PCT/ JP2021/ 001872, dated Apr. 13, 2021, 4 pages.
Office Action issued in connection with Chinese Appl. No. 202180008270.5 dated Jun. 25, 2023.
Office Action issued in corresponding Japanese Patent Application No. 2023-141239 dated Apr. 2, 2024 (7 pages).

\* cited by examiner

LIGHT SHIELDING PLATE, CAMERA UNIT, ELECTRONIC DEVICE, AND METHOD OF MANUFACTURING LIGHT SHIELDING PLATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/001872, filed on Jan. 20, 2021, which in turn claims the benefit of JP 2020-006833 filed Jan. 20, 2020 the disclosures of all which are incorporated herein by reference in its entirety.

TECHNICAL FIELD

The present invention relates to a light shielding plate, a camera unit including the light shielding plate, an electronic device including the camera unit, and a method of manufacturing the light shielding plate.

BACKGROUND

Camera units provided in electronic devices such as smartphones include a light shielding plate that functions as a diaphragm for external light. Light shielding plates made of a resin are often used because the use of a resin allows easy molding of light shielding plates having a predetermined shape (see, for example, Patent Literature 1). However, a light shielding plate made of a resin is light transmissive, and thus external light passes through not only a hole of the light shielding plate through which external light is to pass but also a portion of the light shielding plate that defines the hole. Thus, the degree of light shielding by light shielding plates made of a resin is insufficient, leading to the use of light shielding plates made of metal that have better light shielding properties (see, for example, Patent Literature 2).

CITATION LIST

Patent Literature

[PTL 1] JP 2010-8786 A; [PTL 2] WO 2016/060198 A.

SUMMARY OF THE INVENTION

Technical Problem

Light shielding plates made of metal are manufactured by punching processing in which a metal plate is punched by a die, because punching processing has low processing difficulty and enables a large number of products to be manufactured per unit time. In processing of metal plates using punching processing, when a metal plate is punched by a die, it is necessary to punch the metal plate in a direction perpendicular to the surface of the metal plate in order to prevent deformation or distortion of the metal plate, thereby ensuring the accuracy of the product dimension. Thus, in a cross section perpendicular to the surface of the metal plate, a hole having a side surface that extends perpendicular to the surface of the metal plate is formed in the metal plate.

When a light shielding plate having such a hole is mounted on a camera unit, in some cases, external light entering the light shielding plate in a direction that forms an acute angle with the surface of the light shielding plate is reflected by a side surface defining the hole and then passes through the hole. The light passing through the hole is received by an image sensor of the camera unit, and this may cause the appearance of excessive reflected light such as ghosting and flare in an image captured by the image sensor. Thus, metal light shielding plates have a new problem due to the fact that the light shielding plates are made of metal.

An object of the present invention is to provide a light shielding plate, a camera unit, an electronic device, and a method of manufacturing the light shielding plate that are capable of preventing the appearance of excessive reflected light in a captured image due to this light having passed through a hole.

Solution to Problem

A light shielding plate for solving the above problem is a light shielding plate made of metal. The light shielding plate includes a front surface located on a light incident side, a rear surface opposite to the front surface, and a hole passing through the light shielding plate between the front surface and the rear surface. The hole has a first hole portion and a second hole portion that is connected to the first hole portion at an intermediate opening. The first hole portion extends from a rear surface opening on the rear surface to the intermediate opening and is shaped so as to taper from the rear surface toward the front surface. The second hole portion extends from a front surface opening on the front surface to the intermediate opening and is shaped so as to taper from the front surface toward the rear surface. The front surface opening is larger than the rear surface opening. The intermediate opening has a circularity of 3 μm or less.

A method of manufacturing a light shielding plate, the method including disposing a first resist layer and a second resist layer on a front surface and a rear surface of a metal foil, respectively; subjecting the first and second resist layers to exposure and development to form a first resist mask and a second resist mask from the first and second resist layers, respectively; and forming a hole passing through the metal foil between the front surface and the rear surface by etching the metal foil with the first and second resist masks formed thereon, the hole having a front surface opening and a rear surface opening located on the front surface and the rear surface, respectively, the front surface opening being larger than the rear surface opening. The step of forming a hole includes performing a hole forming process of etching the metal foil with the first and second resist masks formed thereon to form each of a first hole portion and a second hole portion in the metal foil, resulting in an intermediate opening connecting the first and second hole portions, the first hole portion being designed to extend from the rear surface opening toward the front surface and shaped so as to taper from the rear surface toward the front surface, the second hole portion being designed to extend from the front surface opening toward the rear surface and shaped so as to taper from the front surface toward the rear surface, the intermediate opening having a circularity of 3 μm or less. The step of performing the hole forming process includes forming one of the first hole portion and the second hole portion earlier than the other thereof; filling a protector into the earlier-formed one of the first hole portion and the second hole portion for protecting the earlier-formed one of the first hole portion and the second hole portion; and in a state in which the earlier-formed one of the first hole portion and the second hole portion has been filled with the protector, etching the metal foil to form the other of the first hole portion and the second hole portion.

In the light shielding plate and the method of manufacturing the light shielding plate, the second hole portion is shaped so as to taper from the front surface toward the rear surface; thus, light entering the hole from obliquely above the front surface is easily reflected by the side surface defining the second hole portion toward the front surface of the light shielding plate. Furthermore, the first hole portion shaped so as to increase in diameter from the intermediate opening toward the rear surface restricts light that is reflected by the side surface defining the first hole portion after entering the first hole portion from the second hole portion. Thus, the first hole portion and the second hole portion can reduce the amount of light reflected by the side surface of the hole.

Furthermore, since the circularity of the intermediate opening is 3 μm or less, it is possible to prevent distortion of the intermediate opening which is a path of light entering the hole, thus preventing an excessive amount of light from passing through the hole from the second hole portion toward the first hole portion at a part of the periphery of the intermediate opening.

For these reasons, the light shielding plate and the method of manufacturing the light shielding plate can prevent the appearance of excessive reflected light in a captured image due to this light having passed through the hole.

DETAILED DESCRIPTION

Figure 1:
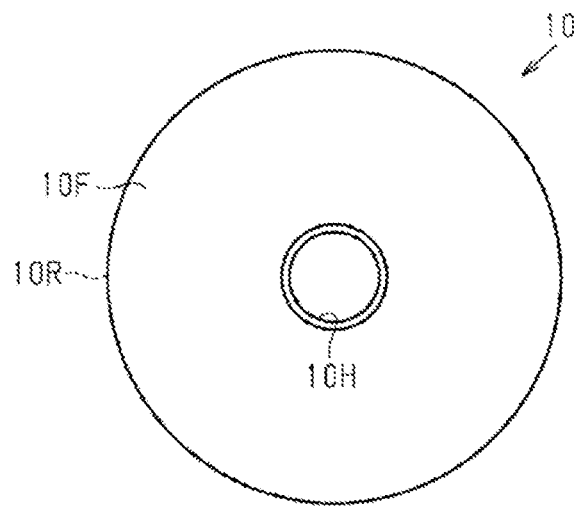
FIG. 1 is a plan view illustrating a structure of a light shielding plate of an embodiment.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

An embodiment of a light shielding plate, a camera unit, an electronic device, and a method of manufacturing the light shielding plate will be described with reference to FIGS. 1 to 14. In the following, the light shielding plate, the method of manufacturing the light shielding plate, the camera unit, and Examples will be described in this order.

Light Shielding Plate

A light shielding plate will be described with reference to FIGS. 1 to 7.

As shown in FIG. 1, a light shielding plate 10 made of metal has a front surface 10F, a rear surface 10R, and a hole 10H. The front surface 10F is a surface located on a light incident side. The rear surface 10R is a surface opposite to the front surface 10F. The hole 10H passes through the light shielding plate 10 between the front surface 10F and the rear surface 10R. The light shielding plate 10 is made of, for example, stainless steel, but may be made of metal other than stainless steel. In the light shielding plate 10, the front surface 10F, the rear surface 10R, and a side surface defining the hole 10H are covered with an antireflection coating (not shown). The antireflection coating has a lower reflectance than the metal constituting the light shielding plate 10, and has a function of absorbing part of light incident on the antireflection coating. The antireflection coating that covers the light shielding plate 10 cannot completely prevent reflection of light by the light shielding plate 10.

The light shielding plate 10 has a circular shape corresponding to the shape of a lens that the light shielding plate 10 covers. The hole 10H has a circular shape corresponding to the shape of a lens that the hole 10H faces.

Figure 2:
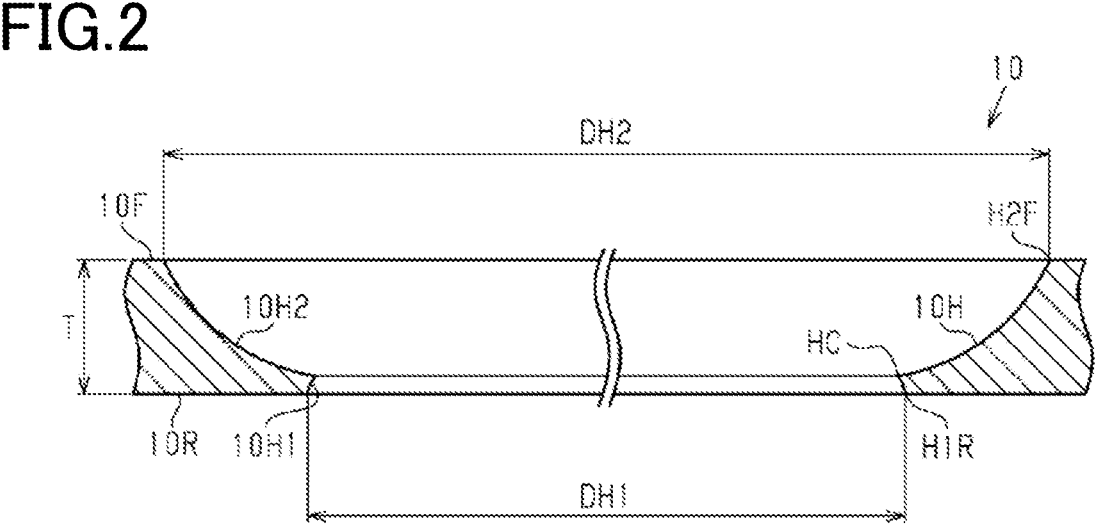
FIG. 2 is a cross-sectional view illustrating the structure of the light shielding plate shown in FIG. 1.

FIG. 2 shows a structure of the light shielding plate 10 in a cross section perpendicular to the front surface 10F of the light shielding plate 10.

As shown in FIG. 2, the hole 10H has a first hole portion 10H1 and a second hole portion 10H2. A rear surface opening H1R of the first hole portion 10H1 is located on the rear surface 10R. The first hole portion 10H1 is shaped so as to taper from the rear surface 10R toward the front surface 10F. In other words, the first hole portion 10H1 is shaped so as to increase in diameter from the front surface 10F toward the rear surface 10R. A front surface opening H2F of the second hole portion 10H2 is located on the front surface 10F. As viewed perpendicular to the front surface 10F, the front surface opening H2F is larger than the rear surface opening H1R, and the rear surface opening H1R is located within the front surface opening H2F. The second hole portion 10H2 is shaped so as to taper from the front surface 10F toward the rear surface 10R, and is connected to the first hole portion 10H1. An intermediate opening HC is a circular opening of the first hole portion 10H1 opposite to the rear surface opening H1R.

In the present embodiment, in a cross section along a plane perpendicular to the front surface 10F, a side surface defining the second hole portion 10H2 has an arc shape, and the center of curvature of the side surface defining the second hole portion 10H2 is located outside the light shielding plate 10. Furthermore, a side surface defining the first hole portion 10H1 has an arc shape, and the center of curvature of the side surface defining the first hole portion 10H1 is located outside the light shielding plate 10.

In the light shielding plate 10, a first diameter DH1 is the diameter of the first hole portion 10H1, and a second diameter DH2 is the diameter of the second hole portion 10H2. The first diameter DH1 is a value set according to a camera unit on which the light shielding plate 10 is mounted. When the light shielding plate 10 is mounted, for example, on a camera unit of a smartphone, the first diameter DH1 may be 0.4 mm or more and 1.0 mm or less. When the light shielding plate 10 is mounted, for example, on an in-vehicle camera, the first diameter DH1 may be 2.0 mm or more and 7.0 mm or less. The percentage of the first diameter DH1 to the second diameter DH2 ((DH1/DH2)×100) may be, for example, 80% or more and 99% or less.

When the light shielding plate 10 is mounted on a camera unit installed on the front surface of a smartphone, a tablet personal computer, or a laptop personal computer, in many cases, the camera unit captures an image of a subject at a short distance. Accordingly, although the angle of view is large, in order for the lens to be focused on the subject, the light shielding plate 10 does not need to have a large inner diameter. Furthermore, due to restrictions on the space for disposing the camera unit, it is difficult for the light shielding plate 10 to have a large outer diameter. Thus, the percentage of the first diameter DH1 to the second diameter DH2 may be 80% or more and 90% or less.

On the other hand, when the light shielding plate 10 is mounted on an in-vehicle camera, in many cases, the in-vehicle camera captures an image of a subject at a medium to long distance. Accordingly, although the angle of view is small, due to there being less restriction on the space for disposing the camera unit, the lens of the camera unit has a large diameter. Thus, in order for the lens to collect light in a wide range, in the light shielding plate 10, the percentage of the first diameter DH1 to the second diameter DH2 may be 90% or more and 99% or less.

When the light shielding plate 10 is mounted on a camera unit installed on the rear surface of a smartphone, an image of a subject is captured at a short to long distance. Thus, in order to address the case where the angle of view is large, the percentage of the first diameter DH1 to the second diameter DH2 may be 80% or more and 90% or less, and in order to address the case where the angle of view is small, the percentage of the first diameter DH1 to the second diameter DH2 may be 90% or more and 99% or less.

The light shielding plate 10 may have a thickness T of, for example, 10 μm or more and 100 μm or less. When the thickness T of the light shielding plate 10 is 10 μm or more, it is possible to prevent the shape of the light shielding plate 10 from being affected by warpage of a metal foil for forming the light shielding plate 10. When the thickness T of the light shielding plate 10 is 100 μm or less, it is possible to prevent a reduction in the accuracy of etching for forming the hole 10H.

Figure 3:
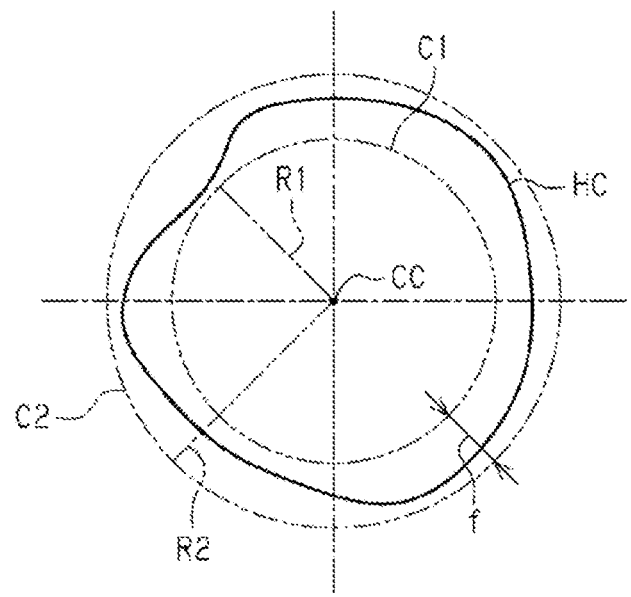
FIG. 3 is a schematic diagram illustrating the circularity of an intermediate opening of the light shielding plate shown in FIG. 1.

FIG. 3 schematically shows the shape of the intermediate opening HC as viewed perpendicular to the front surface 10F of the light shielding plate 10.

The intermediate opening HC of the light shielding plate 10 has a circular shape as viewed perpendicular to the front surface 10F of the light shielding plate 10. In the present embodiment, the hole 10H of the light shielding plate 10 is formed by wet etching a metal foil for forming the light shielding plate 10. Specifically, in the metal foil, the first hole portion 10H1 is formed and then the second hole portion 10H2 is formed, and thus the second hole portion 10H2 is connected to the first hole portion 10H1 to form the intermediate opening HC. The intermediate opening HC formed in this process is more likely to have a high circularity as compared with a hole formed by punching processing of a metal foil.

Circularity is defined in JIS B 0621-1984 "Definitions and designations of geometrical deviations". As described in "5.3 Circularity" of the standard, circularity is indicated by "a difference (f) in radius between two geometric circles concentric with a rounded shape (C) located between the two concentric circles with a minimum gap therebetween".

Specifically, as shown in FIG. 3, for the intermediate opening HC having a center CC, a first circle C1 and a second circle C2 having the same center CC are set. The first circle C1 is a perfect circle that is located inside a region defined by the intermediate opening HC and is in contact with the intermediate opening HC. On the other hand, the second circle C2 is a perfect circle that is located outside the region defined by the intermediate opening HC and is in contact with the intermediate opening HC. The first circle C1 and the second circle C2 are set so that the gap between the first circle C1 and the second circle C2 is minimum. The circularity of the intermediate opening HC is indicated by a difference (f) between a radius R1 of the first circle C1 and a radius R2 of the second circle C2. In the light shielding plate 10, the intermediate opening HC has a circularity of 3 μm or less.

Figure 4:
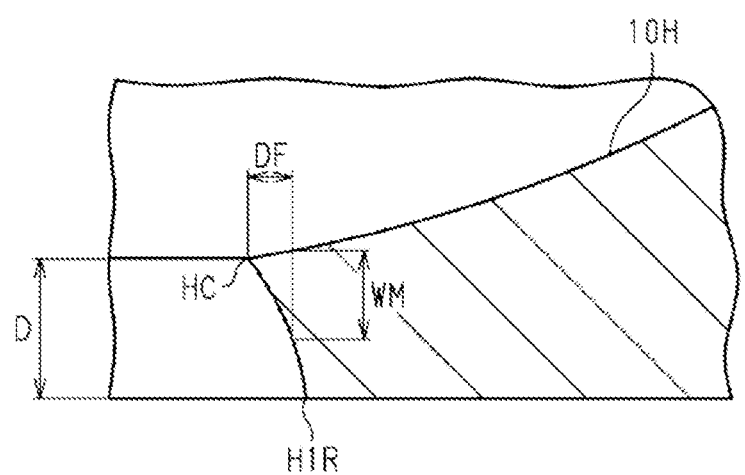
FIG. 4 is a partial enlarged cross-sectional view illustrating an enlarged portion of the cross-sectional view shown in FIG. 2.

FIG. 4 shows an enlarged portion of the cross-sectional structure of the light shielding plate 10 shown in FIG. 2.

As shown in FIG. 4, a maximum width WM is the maximum width of a portion of the light shielding plate 10 in focus in the thickness direction of the light shielding plate 10 when an image of the edge of the intermediate opening HC is captured in the radial direction of the intermediate opening HC while the edge of the intermediate opening HC is in focus with a depth of field being set to 0.4 µm. That is, the maximum width WM is the thickness of the light shielding plate 10 at a position away, in a direction perpendicular to the thickness direction of the light shielding plate 10, from the edge of the intermediate opening HC, by the same distance as a depth of field DF. The maximum width WM is 2.5 µm or less. Furthermore, the maximum width WM may be 0.5 µm or more. The maximum width WM may be greater than 1.0 µm.

Since the maximum width of the portion of the light shielding plate 10 in focus is 2.5 µm or less, it is possible to reduce the area of the side surface defining the hole 10H in the vicinity of the intermediate opening HC, thereby reducing the amount of light that is reflected by the side surface defining the hole 10H in the vicinity of the intermediate opening HC. This can reduce the amount of light that is reflected by the side surface defining the hole (i.e., hole side surface) and passes through the hole 10H. When the maximum width of the portion of the light shielding plate in focus is greater than 1.0 µm, it is possible to prevent deformation of the light shielding plate in the vicinity of the intermediate opening HC. This prevents the amount of light passing through the light shielding plate 10 via the intermediate opening HC from varying due to deformation of the light shielding plate 10.

Figure 5:
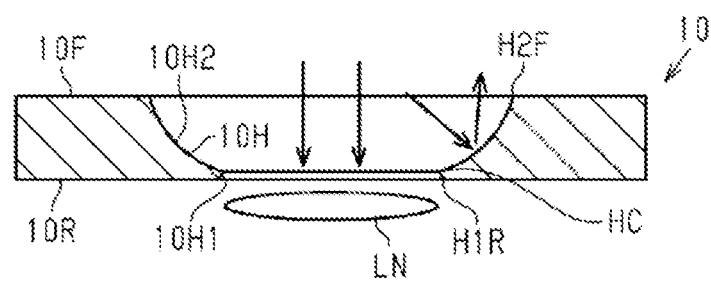
FIG. 5 is a diagram illustrating the action of the light shielding plate shown in FIG. 1.
Figure 6:
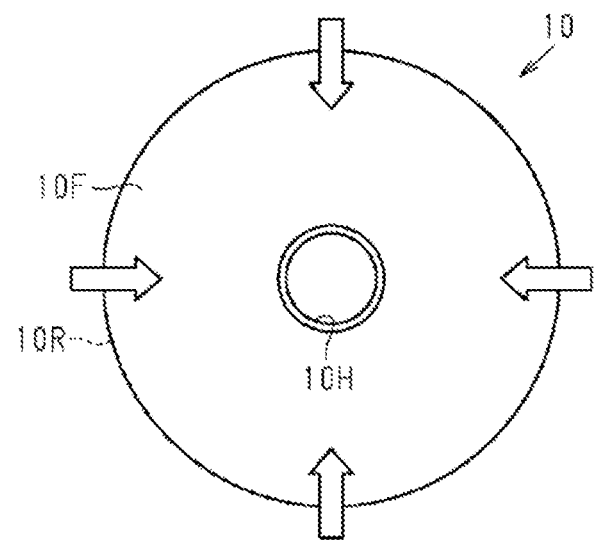
FIG. 6 is a diagram illustrating the action of the light shielding plate shown in FIG. 1.
Figure 7:
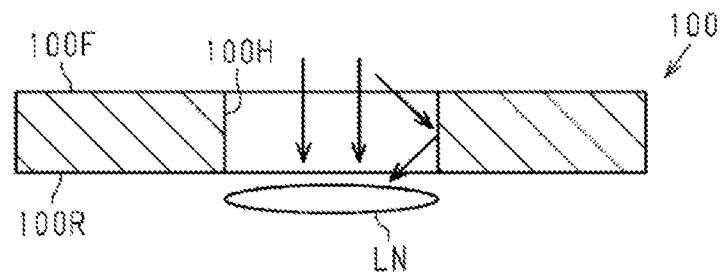
FIG. 7 is a diagram illustrating the action of the light shielding plate shown in FIG. 1.

FIG. 5 shows a cross-sectional structure of the light shielding plate 10 of the present embodiment. FIG. 6 shows a planar structure of the light shielding plate 10 as viewed perpendicular to the front surface 10F of the light shielding plate 10. On the other hand, FIG. 7 shows a cross-sectional structure of an example in which in a cross section perpendicular to a front surface, a hole side surface extends in a direction perpendicular to the front surface. For convenience of illustration, in FIGS. 5 and 7, the first diameter is shown reduced relative to the thickness of the light shielding plate.

As shown in FIG. 5, light entering the light shielding plate 10 in a direction perpendicular to the front surface 10F enters the hole 10H through the front surface opening H2F formed on the front surface 10F. Then, the light passing through the hole 10H exits the rear surface opening H1R formed on the rear surface 10R, and reaches a lens LN. On the other hand, since in the light shielding plate 10, the second hole portion 10H2 is shaped so as to taper from the front surface 10F toward the rear surface 10R, light entering the hole 10H from obliquely above the front surface 10F is easily reflected by the side surface defining the second hole portion 10H2 toward the front surface 10F of the light shielding plate 10.

Light entering the second hole portion 10H2 from obliquely above the front surface 10F is reflected by the side surface having an arc shape with a center of curvature located outside the light shielding plate 10. Thus, specular reflection light, which is reflected light having the highest luminance, is reflected in a direction from the side surface having an arc shape toward the front surface 10F of the light shielding plate 10. This further reduces the amount of light that is reflected by the side surface defining the hole 10H and passes through the hole 10H.

Furthermore, the first hole portion 10H1 shaped so as to increase in diameter from the intermediate opening HC toward the rear surface 10R restricts light that is reflected by the side surface defining the first hole portion 10H1 after entering the first hole portion 10H1 from the second hole portion 10H2. In addition, in the light shielding plate 10, the side surface defining the first hole portion 10H1 has an arc shape with a center of curvature located outside the light shielding plate 10. This makes it possible to reduce the amount of light that enters the hole from obliquely above the front surface 10F and is reflected by the side surface defining the hole 10H in the vicinity of the rear surface opening H1R, as compared with the case where the side surface defining the first hole portion 10H1 has a linear shape. This can further reduce the amount of light that is reflected by the side surface defining the hole 10H and passes through the hole.

The shape of the first hole portion 10H1 and the second hole portion 10H2 constituting the hole 10H of the light shielding plate 10 can reduce the amount of light that is reflected by the side surface defining the hole 10H and passes through the hole 10H. This can prevent the appearance of excessive reflected light in a captured image due to this light having passed through the hole 10H.

As shown in FIG. 6, light enters the hole 10H of the light shielding plate 10 from the entire periphery of the hole 10H. In order to allow light to uniformly enter the entire portion of the hole 10H in the circumferential direction of the hole 10H, the intermediate opening HC which is a path of light entering the hole 10H preferably has a shape with less deviation from a perfect circle. In this regard, since the circularity of the intermediate opening HC is 3 µm or less, it is possible to prevent distortion of the intermediate opening HC which is a path of light entering the hole 10H, thus preventing an excessive amount of light from passing through the hole 10H from the second hole portion 10H2 toward the first hole portion 10H1 at a part of the intermediate opening HC in the circumferential direction. This can prevent the appearance of excessive reflected light in a captured image due to this light having passed through the hole 10H.

As shown in FIG. 7, light entering a light shielding plate 100 in a direction perpendicular to a front surface 100F enters a hole 100H through an opening formed on the front surface 100F, as with light entering the light shielding plate 10 in a direction perpendicular to the front surface 10F. Then, the light passing through the hole 100H exits through an opening formed on a rear surface 100R, and reaches the lens LN. On the other hand, part of the light entering the front surface 100F from obliquely above the front surface 100F enters the hole 100H through the opening formed on the front surface 100F and is reflected by a side surface defining the hole 100H. Most of the light incident on the side surface is reflected in the direction of specular reflection; thus, the light incident on the side surface is reflected from the side surface toward the lens LN. This causes unintended light to be incident on an image sensor through the lens LN.

Method of Manufacturing Light Shielding Plate

A method of manufacturing the light shielding plate 10 will be described with reference to FIGS. 8 to 13. Each of FIGS. 8 to 13 shows a cross-sectional structure of a metal foil in a specific step in the process of manufacturing the light shielding plate 10. For convenience of illustration, in FIGS. 8 to 13, the ratio of the second diameter DH2 to the thickness of the metal foil is shown smaller than that of the actual light shielding plate 10, and the ratio of the first diameter DH1 to the thickness of the metal foil is shown smaller than that of the actual light shielding plate 10. For convenience of illustration, in FIGS. 8 to 13, the ratio of the first diameter DH1 to the second diameter DH2 is smaller than that of the actual light shielding plate 10. For convenience of description, FIGS. 8 to 13 show only the steps related to formation of the hole 10H of the light shielding plate 10 in the process of manufacturing the light shielding plate 10.

The method of manufacturing the light shielding plate 10 includes disposing resist layers, forming resist masks, and forming a hole. In the step of disposing resist layers, a first resist layer and a second resist layer are disposed on a front surface and a rear surface of a metal foil, respectively. In the step of forming resist masks, the resist layers are subjected to exposure and development to form respective resist masks. In the step of forming a hole, a hole passing through the metal foil between the front surface and the rear surface is formed by etching the metal foil using the resist masks. The method of manufacturing the light shielding plate 10 will be more specifically described below with reference to the drawings.

Figure 8:
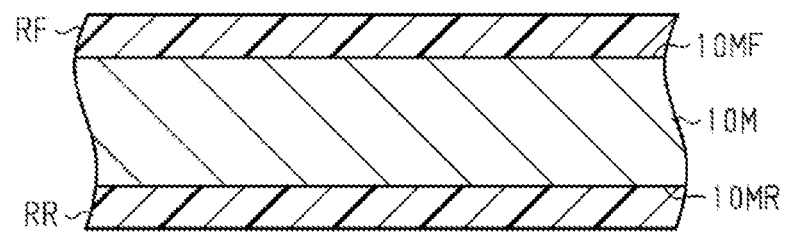
FIG. 8 is a process diagram illustrating a method of manufacturing the light shielding plate.

As shown in FIG. 8, when the light shielding plate 10 is formed, first, a metal foil 10M for forming the light shielding plate 10 is prepared. The metal foil 10M is, for example, a stainless steel foil, but may be a metal foil made of metal other than stainless steel as described above. The metal foil 10M has a thickness of 10 μm or more and 100 μm or less. When the thickness of the metal foil 10M is 10 μm or more, it is possible to prevent warpage of the metal foil 10M from affecting the shape of the light shielding plate 10. When the thickness of the metal foil 10M is 100 μm or less, it is possible to prevent a reduction in the accuracy of etching for forming the hole 10H. The thickness of the metal foil 10M is substantially the same as the thickness of the light shielding plate 10 manufactured from the metal foil 10M.

Then, a resist layer is disposed on a front surface 10MF and a rear surface 10MR of the metal foil 10M. The front surface 10MF of the metal foil 10M corresponds to the front surface 10F of the light shielding plate 10, and the rear surface 10MR of the metal foil 10M corresponds to the rear surface 10R of the light shielding plate 10. A front surface resist layer RF is disposed on the front surface 10MF of the metal foil 10M, and a rear surface resist layer RR is disposed on the rear surface 10MR of the metal foil 10M. Dry film resists may be bonded as the resist layers RF and RR to the front surface 10MF and the rear surface 10MR, respectively. Alternatively, a coating liquid for forming the resist layers RF and RR may be used to form the resist layers RF and RR on the front surface 10MF and the rear surface 10MR, respectively. The resist layers RF and RR may be made of a negative resist or a positive resist.

Figure 9:
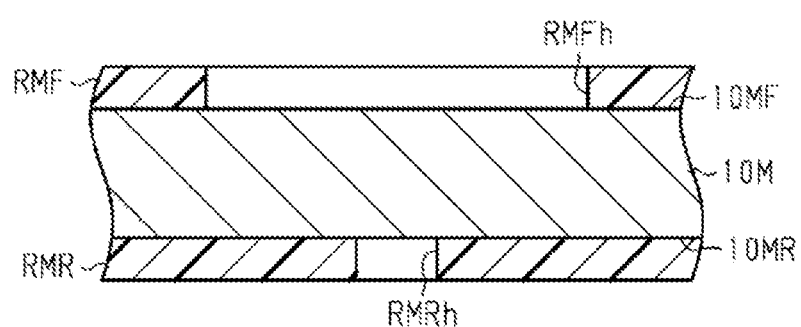
FIG. 9 is a process diagram illustrating the method of manufacturing the light shielding plate.

As shown in FIG. 9, the resist layers RF and RR are exposed and developed to form resist masks from the resist layers. More specifically, the front surface resist layer RF is exposed and developed to form a front surface mask RMF from the front surface resist layer RF. Furthermore, the rear surface resist layer RR is exposed and developed to form a rear surface mask RMR from the rear surface resist layer RR. The front surface mask RMF has a mask hole RMFh for forming a second hole portion in the metal foil 10M. The rear surface mask RMR has a mask hole RMRh for forming a first hole portion in the metal foil 10M.

Figure 10:
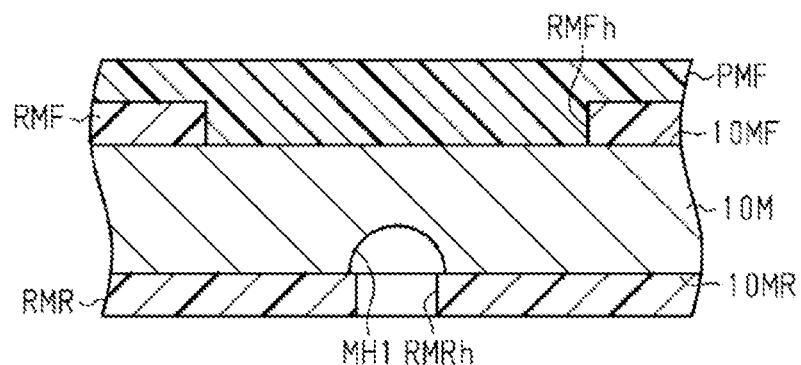
FIG. 10 is a process diagram illustrating the method of manufacturing the light shielding plate.

As shown in FIG. 10, the rear surface mask RMR formed on the rear surface 10MR is used to form a first hole portion MH1 having a rear surface opening on the rear surface 10MR and being shaped so as to taper from the rear surface 10MR toward the front surface 10MF in the metal foil 10M. The first hole portion MH1 corresponds to the first hole portion 10H1 of the light shielding plate 10. The first hole portion MH1 is formed by etching the metal foil 10M using an etching solution capable of etching the metal foil 10M. Before etching the metal foil 10M, the front surface mask RMF is covered with a front surface protective film PMF that is resistant to the etching solution. The front surface protective film PMF may be filled in the mask hole RMFh of the front surface mask RMF, or may merely cover the mask hole RMFh of the front surface mask RMF. By covering the front surface mask RMF with the front surface protective film PMF, it is possible to prevent the front surface 10MF of the metal foil 10M from being etched together with the rear surface 10MR of the metal foil 10M.

When the first hole portion MH1 is formed by etching the rear surface 10MR, the formed first hole portion MH1 has a depth greater than a distance D (see FIG. 4) between the rear surface 10R and the intermediate opening HC of the light shielding plate 10.

Figure 11:
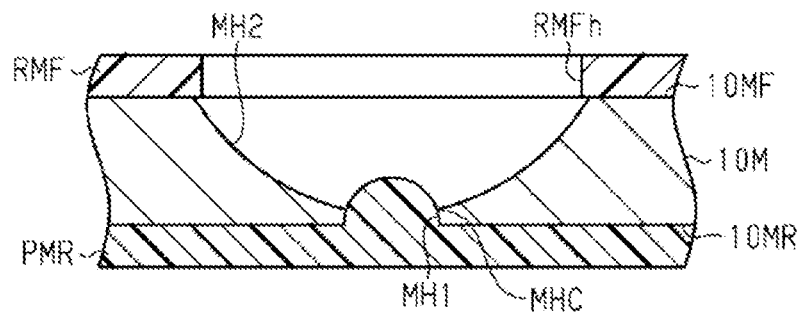
FIG. 11 is a process diagram illustrating the method of manufacturing the light shielding plate.

As shown in FIG. 11, after formation of the first hole portion MH1, the front surface mask RMF formed on the front surface 10MF is used to form, in the metal foil 10M, a second hole portion MH2 having a front surface opening on the front surface 10MF and being shaped so as to taper from the front surface 10MF toward the rear surface 10MR. Thus, the second hole portion MH2 is connected to the first hole portion MH1 to form an intermediate opening MHC. The second hole portion MH2 corresponds to the second hole portion 10H2 of the light shielding plate 10. The intermediate opening MHC corresponds to the intermediate opening HC of the light shielding plate 10.

As in the case where the first hole portion MH1 is formed, the second hole portion MH2 is formed by etching the metal foil 10M using an etching solution capable of etching the metal foil 10M. Before etching the metal foil 10M, the rear surface mask RMR is removed from the rear surface 10MR of the metal foil 10M. Then, before etching the metal foil 10M, the rear surface 10MR of the metal foil 10M is covered with a rear surface protective film PMR that is resistant to the etching solution, and the first hole portion MH1 is filled with the rear surface protective film PMR. The rear surface protective film PMR is an example of a protector. By covering the rear surface 10MR of the metal foil 10M with the rear surface protective film PMR, it is possible to prevent the rear surface 10MR of the metal foil 10M from being etched together with the front surface 10MF of the metal foil 10M.

In etching for the second hole portion MH2, the front surface 10MF of the metal foil 10M is etched in a state in which the first hole portion MH1 is filled with the rear surface protective film PMR. Thus, after the etching of the front surface 10MF reaches the rear surface protective film PMR, the rear surface protective film PMR controls the supply of the etching solution to the metal foil 10M. This makes it possible to improve the accuracy of the cross-sectional shape of the second hole portion MH2, even when the thickness of the metal foil 10M is in a wide range of 10 μm or more and 100 μm or less. On the other hand, if the first hole portion MH1 is not filled with the rear surface protective film PMR, when the first hole portion MH1 and the second hole portion MH2 are connected and pass through the metal foil 10M, the etching solution leaks through the connection portion between the first hole portion MH1 and the second hole portion MH2 toward the rear surface 10MR of the metal foil 10M. This reduces the accuracy of the shape of the first hole portion MH1 and the shape of the second hole portion MH2.

Thus, in the method of manufacturing the light shielding plate 10 of the present embodiment, the step of forming the hole 10H includes the following.

(A) Forming the first hole portion MH1 having the rear surface opening on the rear surface 10MR of the metal foil 10M and being shaped so as to taper from the rear surface 10MR toward the front surface 10MF.

(B) Forming the second hole portion MH2 having the front surface opening larger than the rear surface opening on the front surface 10MF and being shaped so as to taper from the front surface 10MF toward the rear surface 10MR.

(C) Through formation of the first hole portion MH1 and the second hole portion forming the intermediate opening WIC, which is a circular opening of the first hole portion MH1 that is opposite to the rear surface opening and has a circularity of 3 µm or less.

(D) In a state in which the first hole portion MH1 or the second hole portion whichever is formed earlier, is filled with the protector for protecting the hole portion formed earlier, forming the other of the first hole portion MH1 and the second hole portion MH2.

The method of manufacturing the light shielding plate 10 of the present embodiment enables formation of the hole 10H shaped so as to prevent the appearance of excessive reflected light in a captured image due to this light having passed through the hole 10H. This manufacturing method, in which the first hole portion 10H1 (MH1) and the second hole portion 10H2 (MH2) are sequentially formed, has a unique and new problem of the difficulty in controlling the circularity of the intermediate opening HC (MHC) which is a path of light entering the hole 10H, as compared with the case where the hole is formed in one step by punching the metal foil 10M.

In this regard, the above (D) of the manufacturing method solves the problem, allowing formation of the intermediate opening HC (MEW) having a circularity of 3 µm or less.

When the second hole portion MH2 is formed in the metal foil 10M, it is preferable to form the second hole portion MH2 so that the second hole portion MH2 is connected to the first hole portion MH1 at a position in the vicinity of a center portion of the first hole portion MH1 in the thickness direction of the metal foil 10M in a cross section perpendicular to the front surface 10MF. The second hole portion MH2 is preferably connected to the first hole portion MH1 at a position within ±1 µm from the center portion of the first hole portion MH1 in the thickness direction of the metal foil 10M in a cross section perpendicular to the front surface 10MF.

Figure 12:
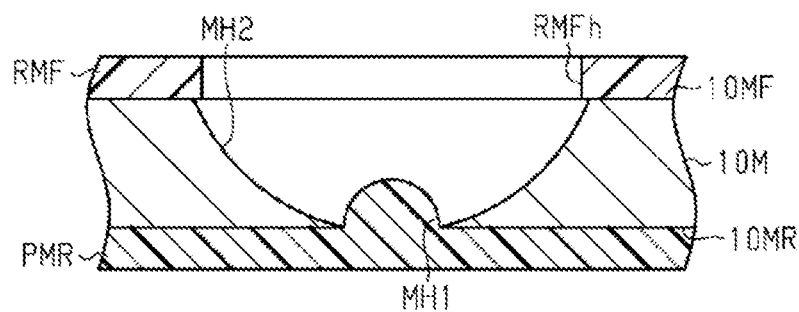
FIG. 12 is a process diagram illustrating the method of manufacturing the light shielding plate.

As shown in FIG. 12, when the second hole portion MH2 is connected to the first hole portion MH1 at the rear surface opening of the first hole portion MH1 in a cross section perpendicular to the front surface 10MF, the metal foil 10M has a very small thickness in the vicinity of the rear surface opening. This causes excessive etching of a portion of the metal foil 10M in the vicinity of the rear surface opening or variation in the degree of etching of the metal foil 10M in the circumferential direction of the rear surface opening during etching for connecting the second hole portion MH2 to the first hole portion MH1. This tends to lead to a small maximum width WM of the light shielding plate 10 but also produce a high circularity.

Figure 13:
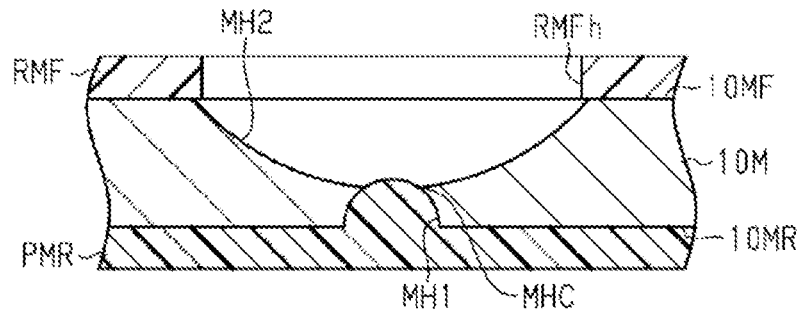
FIG. 13 is a process diagram illustrating the method of manufacturing the light shielding plate.

As shown in FIG. 13, when the second hole portion MH2 is connected to the first hole portion MH1 at a position in the vicinity of a bottom portion of the first hole portion MH1 in a cross section perpendicular to the front surface 10MF, the maximum width WM of the light shielding plate 10 is large, thus preventing excessive etching of the metal foil 10M and variation in the degree of etching of the metal foil 10M in the vicinity of the rear surface opening. This tends to lead to a low circularity but also produce a large maximum width WM of the light shielding plate 10.

On the other hand, the method described above with reference to FIG. 11 can prevent both the high circularity of the intermediate opening HC and the large maximum width WM of the light shielding plate 10. This can prevent the appearance of excessive reflected light, i.e., ghosting and flare, in a captured image due to this light passing through the hole 10H.

After the first hole portion MH1 and the second hole portion MH2 are formed, the front surface mask RMF is removed from the front surface 10MF, and the rear surface protective film PMR is removed from the rear surface 10MR. After removal of the front surface mask RMF and the rear surface protective film PMR from the metal foil 10M, an antireflection coating that covers the front surface 10MF, the rear surface 10MR, and the side surfaces defining the first hole portion MH1 and the second hole portion MH2 is formed. As described above, the antireflection coating has a lower reflectance than the metal foil 10M, and has a function of absorbing part of the light incident on the antireflection coating.

The antireflection coating may be, for example, a film having a black color. The antireflection coating may be formed on the metal foil 10M by a film formation method such as sputtering or vapor deposition. Alternatively, the antireflection coating may be formed on the metal foil 10M by causing the metal foil 10M to be in contact with a liquid for forming the antireflection coating.

In the above method of manufacturing the light shielding plate 10, the rear surface mask RMR may not be necessarily removed before formation of the rear surface protective film PMR. In this case, the rear surface protective film PMR that covers the rear surface mask RMR and is filled in the first hole portion MH1 may be formed. After the second hole portion MH2 is formed by etching the front surface 10MF, the rear surface protective film PMR may be removed together with the rear surface mask RMR from the rear surface 10MR.

Camera Unit

Figure 14:
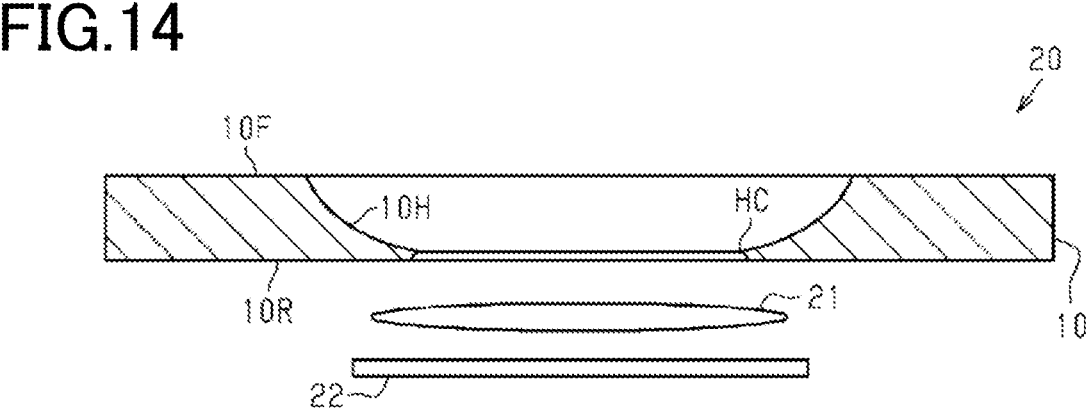
FIG. 14 is a schematic configuration diagram illustrating a structure of a camera unit.

A camera unit will be described with reference to FIG. 14. FIG. 14 schematically shows a configuration of the camera unit.

As shown in FIG. 14, a camera unit 20 includes the light shielding plate 10, a lens 21, and an image sensor 22. The light shielding plate 10 is disposed on the light incident side with respect to the lens 21 so as to have the rear surface 10R facing the lens 21. This allows light passing through the intermediate opening HC to be reflected by the side surface of the hole 10H, thus restricting light incident on the lens 21, as compared with the case where the front surface 10F of the light shielding plate 10 faces the lens 21.

The intermediate opening HC of the light shielding plate 10 may have a diameter equal to or less than the effective diameter of the lens 21. In such a case, it is possible to prevent light passing through the intermediate opening from travelling outside the effective diameter of the lens. This prevents unintended light from being incident on the image sensor.

The image sensor 22 may be a CCD image sensor or a CMOS image sensor. In the camera unit 20, a single lens unit is composed of a single light shielding plate 10 and a single lens 21 adjacent to the light shielding plate 10 on the optical axis along which light passes through the light shielding plate 10. The camera unit 20 may include a plurality of lens units.

The camera unit 20 is mounted on various electronic devices. Such an electronic device includes the camera unit 20, and a housing that supports the camera unit 20. Examples of the electronic device include a smartphone, a tablet personal computer, and a laptop personal computer.

EXAMPLES

Examples and comparative examples of the light shielding plate will be described with reference to Table 1.

A stainless steel plate having a thickness of 25 μm was prepared. In the stainless steel plate, a plurality of first hole portions and then second hole portions connected to the respective first hole portions were formed by a roll-to-roll method. That is, after the first hole portions were formed, the second hole portions were formed. Thus, a plurality of light shielding plate precursors were formed in the stainless steel plate, each of which had a hole having a rear surface opening with a diameter of 493 μm, a front surface opening with a diameter of 680 μm, and an intermediate opening with a diameter of 490 μm.

Each of the light shielding plate precursors was connected to a non-etched region of the stainless steel plate via a part of the light shielding plate in the circumferential direction as viewed perpendicular to the front surface of the light shielding plate. The plurality of light shielding plate precursors were formed in the stainless steel plate so that the intermediate opening of each of the light shielding plates was located at a lattice point of a virtual square lattice set on the stainless steel plate.

In the manufacture of the light shielding plates of Examples 1 to 3 and Comparative Examples 1 and 2, the conveying speed at which the stainless steel plate was conveyed during formation of the first hole portion was set to different values. Specifically, in the manufacture of the light shielding plates of the examples, the conveying speed was set to be higher than in the manufacture of the light shielding plates of the comparative examples. In Examples 1 to 3, the conveying speed was set to be the lowest in Example 1 and to be the highest in Example 3. The conveying speed in Comparative Example 1 was set to be lower than in Comparative Example 2.

In the manufacture of the light shielding plate of Comparative Example 3, a stainless steel plate having a thickness of 25 μm was prepared. Then, a plurality of light shielding plates having a hole with a diameter of 490 μm were formed by punching processing.

Evaluation Method

Among the plurality of light shielding plate precursors formed in the stainless steel plate, the circularity of each light shielding plate precursor in 15 columns and 15 rows was calculated. The circularity was calculated using a laser length measuring device (NEXIV VMZ-R6555, manufactured by Nikon Corporation) and measurement software installed in the device.

Among the plurality of light shielding plate precursors formed in the stainless steel plate, the maximum width WM of each light shielding plate precursor in 15 columns and 15 rows was measured using a confocal laser microscope (VK-X1000 Series, manufactured by Keyence Corporation). For this measurement, an objective lens with a magnification of 50 times was attached to the confocal laser microscope. The hole side surface of each light shielding plate was observed in a direction perpendicular to the hole side surface using the confocal laser microscope while the edge of the intermediate opening was in focus, and the maximum width WM was measured. In the confocal laser microscope, the range in which an object is in focus, i.e., the depth of field, varies depending on the magnification of the objective lens. Since an object is in focus in the depth of field, the maximum width of the portion of the light shielding plate in focus in the thickness direction thereof varies depending on the position relative to the edge of the intermediate opening. Accordingly, in practice, the thickness of the portion of the light shielding plate in focus has a predetermined range. The objective lens with a magnification of 50 times had a depth of field of 0.4 μm. Thus, the maximum width was defined to be the maximum value of the width of the portion of the light shielding plate in focus in the thickness direction of the light shielding plate when the depth of field was set to 0.4 μm and the edge of the intermediate opening was in focus. That is, the maximum width WM of the light shielding plate was the thickness of the light shielding plate at a position apart from the edge of the intermediate opening by the depth of field.

Evaluation Results

In the light shielding plates of Examples 1 to 3 and the light shielding plates of Comparative Examples 1 to 3, the measurement results of the circularity and the measurement results of the maximum width are as shown in Table 1. The circularity and the maximum width shown in Table 1 are the maximum values obtained in the 225 light shielding plate precursors used as measurement objects in each of the examples and the comparative examples.

In each of Examples 1 to 3 and Comparative Examples 1 to 3, the light shielding plate having the highest circularity was used to form a camera unit. Then, an image captured by the camera unit was checked for the appearance of excessive reflected light, i.e., ghosting and flare.

TABLE 1

|  | Circularity (μm) | Maximum width (μm) |
| --- | --- | --- |
| Example 1 | 2.6 | 1.5 |
| Example 2 | 2.1 | 2.0 |
| Example 3 | 2.5 | 2.5 |
| Comparative Example 1 | 4.0 | 0.5 |
| Comparative Example 2 | 3.9 | 1.0 |
| Comparative Example 3 | — | — |

As shown in Table 1, the maximum value of the circularity was 2.6 μm in Example 1, 2.1 μm in Example 2, and 2.5 μm in Example 3. Furthermore, the maximum value of the circularity was 4.0 μm in Comparative Example 1, and 3.9 μm in Comparative Example 2.

The maximum value of the maximum width was 1.5 μm in Example 1, 2.0 μm in Example 2, and 2.5 μm in Example 3. Furthermore, the maximum value of the maximum width was 0.5 μm in Comparative Example 1, and 1.0 μm in Comparative Example 2.

The circularity and the maximum width of the light shielding plate of Comparative Example 3 were not evaluated because the light shielding plate of Comparative Example 3 was not formed by etching a metal foil as described above.

When the images captured by the camera units including the respective light shielding plates were checked, no ghosting or flare was observed in the images captured by the camera units including the light shielding plates of Examples 1 to 3.

On the other hand, ghosting and flare were observed in the images captured by the camera units including the light shielding plates of Comparative Examples 1 to 3. Among the light shielding plates of Comparative Examples 1 to 3, in the light shielding plates of Comparative Examples 1 and 2, presumably, since the light shielding plates had a circularity of more than 3 µm, an excessive amount of light passed through a part of the hole in the circumferential direction, thus causing ghosting and flare. In the light shielding plate of Comparative Example 3, presumably, since the side surface defining the hole was perpendicular to the front surface of the light shielding plate in a cross section perpendicular to the front surface of the light shielding plate, an excessive amount of light was reflected by the side surface defining the hole and passed through the hole, thus causing ghosting and flare.

As described above, according to an embodiment of the light shielding plate, the camera unit, the electronic device, and the method of manufacturing the light shielding plate, the following effects can be obtained.

(1) Since the second hole portion 10H2 is shaped so as to taper from the front surface 10F toward the rear surface 10R, light entering the hole from obliquely above the front surface 10F is easily reflected by the side surface defining the second hole portion 10H2 toward the front surface 10F of the light shielding plate 10. Furthermore, the first hole portion 10H1 shaped so as to increase in diameter from the intermediate opening HC toward the rear surface 10R restricts light that is reflected by the side surface defining the first hole portion 10H1 after entering the first hole portion 10H1 from the second hole portion 10H2. Thus, the first hole portion 10H1 and the second hole portion 10H2 can reduce the amount of light reflected by the side surface of the hole 10H.

(2) Since the circularity of the intermediate opening HC is 3 µm or less, it is possible to prevent distortion of the intermediate opening HC which is a path of light entering the hole 10H, thus preventing an excessive amount of light from passing through the hole 10H from the second hole portion 10H2 toward the first hole portion 10H1 at a part of the intermediate opening HC in the circumferential direction.

(3) Since the maximum width WM of the portion of the light shielding plate 10 that will be in focus is 2.5 µm or less, it is possible to reduce the area of the side surface defining the hole 10H in the vicinity of the intermediate opening HC, thereby reducing the amount of light that is reflected by the side surface defining the hole 10H in the vicinity of the intermediate opening HC. This can reduce the amount of light that is reflected by the side surface defining the hole 10H and passes through the hole 10H.

(4) Since the maximum width WM of the portion of the light shielding plate 10 that will be in focus is more than 1.0 µm, it is possible to prevent deformation of the light shielding plate 10 in the vicinity of the intermediate opening HC. This prevents the amount of light passing through the light shielding plate 10 via the intermediate opening HC from varying due to deformation of the light shielding plate 10.

(5) Since the thickness of the light shielding plate 10 is 10 µm or more, it is possible to prevent warpage of the metal foil 10M for forming the light shielding plate 10 from affecting the shape of the light shielding plate 10. Since the thickness of the light shielding plate 10 is 100 µm or less, it is possible to prevent a reduction in the accuracy of etching for forming the hole 10H.

(6) Since light passing through the intermediate opening HC is reflected by the side surface of the hole 10H, it is possible to restrict light incident on the lens 21, as compared with the case where the front surface 10F of the light shielding plate 10 faces the lens 21.

(7) It is possible to prevent light passing through the intermediate opening HC from travelling outside the effective diameter of the lens 21. This prevents unintended light from being incident on the image sensor 22.

The embodiment described above may be modified and implemented as follows.

Method of Manufacturing Light Shielding Plate

The light shielding plate 10 may be manufactured by forming the second hole portion 10H2 by etching the metal foil 10M, and then forming the first hole portion 10H1 so that the first hole portion 10H1 is connected to the second hole portion 10H2. In such a case, the first hole portion 10H1 may be formed to be connected to the second hole portion 10H2 which is filled with the front surface protective film PMF for protecting the second hole portion 10H2. In this case as well, when the hole 10H has the first hole portion 10H1 and the second hole portion 10H2, and the circularity of the intermediate opening HC is 3 µm or less, the same effect as the effect (1) can be obtained.

Metal Foil

The metal foil 10M for forming the light shielding plate 10 is not limited to a stainless steel foil, and may be, for example, a metal foil made of an iron-nickel alloy or a metal foil made of an iron-nickel-cobalt alloy. The iron-nickel alloy may be, for example, Invar, and the iron-nickel-cobalt alloy may be, for example, Super Invar. That is, the light shielding plate 10 may be made of an iron-nickel alloy or an iron-nickel-cobalt alloy. The light shielding plate 10 may be made of Invar or Super Invar.

When the metal foil 10M is made of an iron-nickel alloy or an iron-nickel-cobalt alloy, the following effect can be obtained.

(8) It is possible to prevent deformation of the light shielding plate 10 due to a change in the outside air temperature, thereby preventing a change in the amount of incident external light due to a change in the outside air temperature. This can prevent the occurrence of ghosting and flare due to a change in the amount of incident external light.

The metal foil 10M for forming the light shielding plate 10 may have a thickness of less than 10 µm or may have a thickness of more than 100 µm. That is, the light shielding plate 10 may have a thickness of less than 10 µm, or may have a thickness of more than 100 µm. In this case as well, when the hole 10H has the first hole portion 10H1 and the second hole portion 10H2, and the circularity of the intermediate opening HC is 3 µm or less, the same effect as the effect (1) can be obtained.

Light Shielding Plate

The maximum width WM of the light shielding plate 10 may be less than 0.5 µm, or may be more than 2.5 µm. In such a case as well, when the hole 10H has the first hole portion 10H1 and the second hole portion 10H2, and the circularity of the intermediate opening HC is 3 µm or less, the same effect as the effect (1) can be obtained.

What is claimed is:

1. A light shielding plate made of a metal, the light shielding plate comprising:

a front surface located on a light incident side;
a rear surface opposite to the front surface; and
a hole that passes through the light shielding plate between the front surface and the rear surface, wherein
the hole has a first hole portion, a second hole portion, a front surface opening on the front surface, a rear surface opening on the rear surface, and an intermediate opening, the first and second hole portions being connected to each other at the intermediate opening,
the first hole portion extends from the rear surface opening to the intermediate opening and is shaped so as to taper from the rear surface toward the front surface,
the second hole portion extends from the front surface opening to the intermediate opening and is shaped so as to taper from the front surface toward the rear surface,
the front surface opening is larger than the rear surface opening, and
the intermediate opening has a circularity of 3 μm or less.

2. The light shielding plate of claim 1, wherein
the light shielding plate has a predetermined thickness,
the light shielding plate has a focused region when an image of an edge of the intermediate opening is captured in a radial direction of the intermediate opening while the edge is in focus with a depth of field being set to 0.4 μm, and
the focused region has a maximum width of 2.5 μm or less in a direction of the thickness of the light shielding plate.

3. The light shielding plate of claim 2, wherein the maximum width of the focused region of the light shielding plate is greater than 1.0 μm.

4. The light shielding plate of claim 1, wherein the light shielding plate has a thickness of 10 μm or more and 100 μm or less.

5. The light shielding plate of claim 1, wherein the light shielding plate is made of an iron-nickel alloy or an iron-nickel-cobalt alloy.

6. The light shielding plate of claim 5, wherein the light shielding plate is made of Invar or Super Invar.

7. A camera unit comprising:
a lens having a light-incident surface; and
the light shielding plate of claim 1, the light shielding plate being disposed with the rear surface thereof facing the light-incident surface of the lens.

8. The camera unit of claim 7, wherein the intermediate opening of the light shielding plate has a diameter less than or equal to an effective diameter of the lens.

9. An electronic device comprising:
the camera unit of claim 7; and
a housing supporting the camera unit.

* * * * *